3,196,092
METHOD FOR SEPARATING COMPONENTS HAVING AN ACID OR ALKALINE REACTION FROM GASES
Henri Bernard Beer, The Hague, Netherlands, assignor to Hermanus Johannes Jansen, Schiedam, Netherlands
Filed Mar. 27, 1959, Ser. No. 802,334
Claims priority, application Netherlands, Apr. 1, 1958, 226,450
5 Claims. (Cl. 204—130)

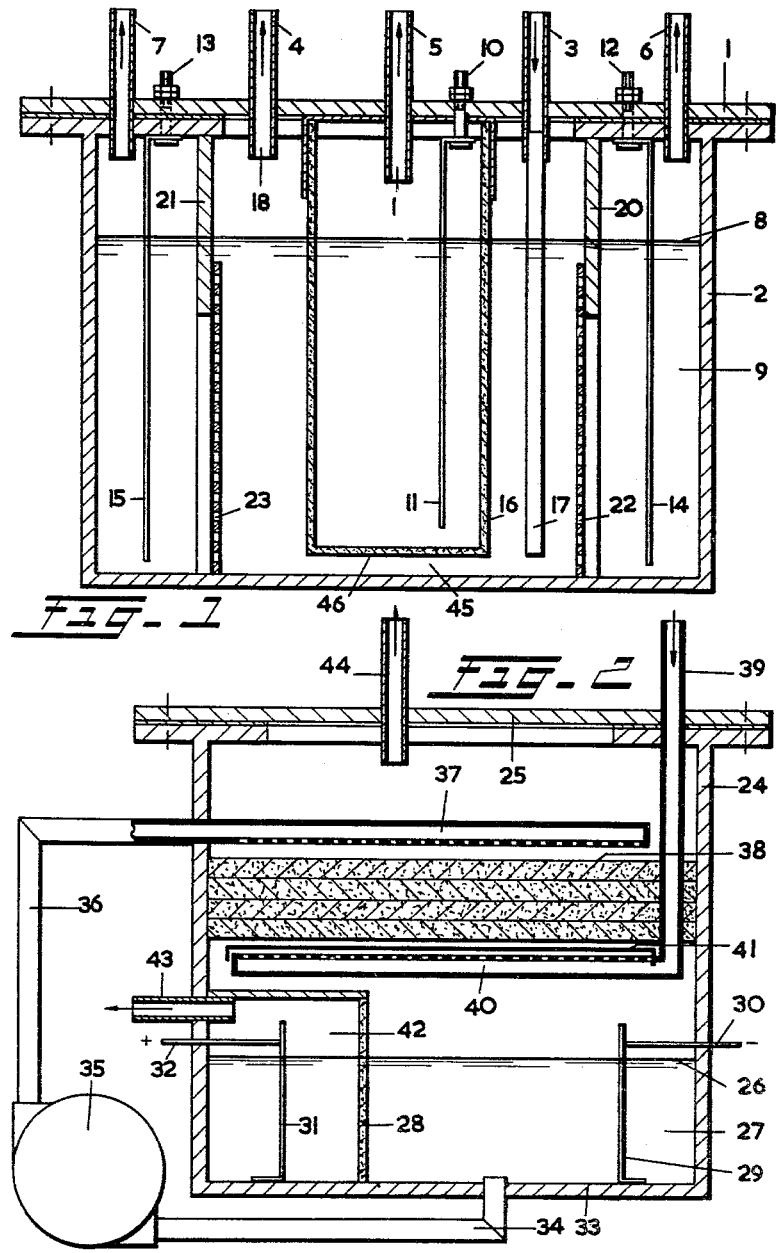

This invention relates to a method and a device for separating components having an acid or alkaline reaction from gases by contacting said gases with a solution of an electrolyte in which said components are absorbed while forming a chemical compound with the electrolyte, the solution being subjected to an electrolysis in a closed vessel partitioned by a diaphragm, which diaphragm separates the products formed during the electrolysis.

According to a known method for separating components having an acid reaction from gases, the products formed in the vessel during the electrolysis and separated by the diaphragm are circulated through separate containers and the gases to be cleaned are fed to the container containing an excess of products having an alkaline reaction, which products absorb the components having an acid reaction while forming a chemical compound. The components absorbed may be recovered in a container in which the circulating products are accumulated whereupon said products are together recycled to the electrolysis vessel.

The object of the present invention is to simplify said known method by providing a new method according to which components which form acid or alkaline aqueous solution may be continuously separated from gases and by so arranging the device to be used for carrying out said method that the separated components admit of being easily recovered.

To achieve this end according to the invention the gases to be treated are passed through that part of the electrolysis vessel which contains the solution capable of binding the components having an acid or an alkaline aqueous solution.

As an example, the solution according to the invention may consist of an aqueous solution of a neutral salt, such as potassium sulphate whose dissociation products are separated by electrolysis and with the aid of a diaphragm into an acid anolyte, sulphuric acid and water, and an alkaline catholyte, potassium hydroxide and water. If the solution of the neutral salt in water was not capable of removing for example the carbon dioxide from the air, this will be bound to occur when the air is blown through the alkaline catholyte, i.e. the electrolyte which has a pH on the opposite side of a neutral pH from an aqueous solution of carbon dioxide, wherein the carbon dioxide is bound while a carbonate is formed. By the electrolysis this carbonate is again converted into carbon dioxide at the anolyte side of the diaphragm and the alkaline catholyte at the other side of the diaphragm, which catholyte is again capable of binding carbon dioxide, the carbon dioxide being liberated in the anolyte and being collected in the part of the vessel partitioned by the diaphragm, from which part the carbon dioxide can be removed. The air passed through does not come into contact with the anolyte on account of the diaphragm provided, so that this air remains free from carbon dioxide.

A solution of a salt will preferably be chosen which is derived from an acid or an alkali which is stronger, i.e. has a pH which is more remote from a neutral pH, than the acid or the alkali formed by the components to be separated which have an acid or alkaline reaction.

For the absorption of carbon dioxide from the air, one might, in lieu of a salt with a strong acid radical, also start from an aqueous solution of only potassium hydroxide, in which solution the carbon dioxide is bound to potassium carbonate, the dissociation products of which salt are split by electrolysis into the catholyte potassium hydroxide and the anolyte carbon dioxide. It has been found, however, that such an electrolyte from only potassium hydroxide has a less economic action than an electrolyte whose alkali metal ion is bound to the ion of a strong acid radical such as for example potassium sulphate, which is probably due to the fact that the carbon dioxide in the anolyte containing space will lead to the formation of but few carbonate ions, so that the conductivity of the electrolyte in the anolyte containing space will become very small. Moreover when e.g. $K_2SO_4$ is used the carbon dioxide will be expelled more readily and completely from the anolyte containing space by the surphuric acid formed before the carbon dioxide reaches the anode.

It has been found to be best to compose the electrolyte for separating gases having an acid reaction such as carbon dioxide, chlorine and the like from a dilute aqueous solution of a salt to which a large quantity of alkali has been added. The purpose of this extra quantity of free alkali beside the neutral salt is that the solution can act immediately from the start, whereas when only the neutral salt alone is in solution, the electrolysis must first occur for some time before the desired products are formed.

In order to absorb carbon dioxide from the air, the carbon dioxide forming an aqueous solution which has a pH more remote from a neutral pH than the other gases in the air, one may use, for example, an aqueous solution of 2% by weight of potassium sulphate to which 25% by weight of potassium hydroxide has been added both percentages being calculated on the total body of liquid. In order to absorb ammonia from the air, the ammonia forming an aqueous solution which has a pH more remote from a neutral pH than the other gases in the air, an aqueous solution of for example 2% by weight of potassium sulphate to which 10% by weight of 99% sulphuric acid has been added, is used.

In the device for carrying out the method according to the invention, which comprises a closed vessel adapted to be partly filled with an electrolyte solution, which vessel is connected with gas supply and gas discharge conduits and is provided with a diaphragm partitioning the vessel into two parts, each part containing one or a plurality of electrodes of the same polarity, the part of the electrolysis space in the vessel on one of the sides of the diaphragm communicates both with the gas supply conduit and with the gas discharge conduit and in addition with one or a plurality of discharge conduits for the gas evolved at the relative electrode(s) during the electrolysis, the other part of the electrolysis space communicating with a discharge conduit for removing the component separated from the gas.

Furthermore it is possible according to the invention to provide a partition wall adjacent one or a plurality of electrodes, which partition wall is provided with apertures below the liquid level and which isolates the gases evolved by the relative electrode(s) from the remainder of the electrolysis space.

According to another feature of the device according to the invention in which the space of the vessel which communicates with gas supply and gas discharge conduits, is provided below the liquid level with a suction conduit including a liquid pump whose delivery conduit ends in the vessel above a bed of material having a large surface, said bed is provided in the vessel above the liquid level in the electrolysis space on the same side of the diaphragm as the connection of the vessel with said suction conduit.

The invention will be further elucidated with reference to the accompanying drawing, in which:

FIG. 1 is a cross section of a device according to the invention.

FIG. 2 is a cross section of another embodiment of the device according to the invention.

According to FIG. 1 the vessel 2 which is hermetically closed by cover 1 is provided with gas supply conduit 3 and gas exhaust conduits 4, 5, 6 and 7. The vessel can be filled up to liquid level 8 with a solution 9 of an electrolyte for example potassium sulphate. In the vessel three electrodes are provided, which extend inside the vessel to below the liquid level and which outside the vessel are connected to current supply contacts. Contact 10 of electrode 11 can be connected to the positive terminal of a voltage source and contacts 12 and 13 respectively of electrodes 14 and 15 respectively can be connected to the negative terminal of this voltage source. Electrode 11 is surrounded by a diaphragm 16, which has the shape of a container from porous inert material, which container is at the top connected to the bottom of the cover.

It is to be preferred not to make the porous partition wall extend entirely to the bottom of the vessel and to leave a space 45 between said bottom and the lower side of said wall and to provide an opening 46 in the bottom of the container 16.

Owing to the current supplied namely the water of the electrolyte has the tendency to move towards the negative space which could result in a difference in level which can be prevented by maintaining an open circulation between the anolyte and the catholyte.

Outlet 17 of gas supply conduit 3 is provided below the liquid level in the vessel at the side of diaphragm 16 remote from electrode 11. This diaphragm is insofar as it extends above the liquid level impermeable to gas and insofar as it extends below the liquid level it is permeable to ions.

Inlet 18 of gas exhaust conduit 4 is provided above the liquid level in the vessel likewise at the side of diaphragm 16 remote from electrode 11.

Inlet 19 of gas exhaust conduit 5 is provided above the liquid level in the vessel at the same side of diaphragm 16 as electrode 11.

Furthermore walls 20 and 21 respectively are provided in the container which below the liquid level are each provided an opening covered with gauze 22 and 23 respectively.

The inlet of gas exhaust conduit 6 and the inlet of gas exhaust conduit 7 respectively are provided above the liquid level near electrodes 12 and 13 respectively at the side of walls 20 and 21 respectively which is remote from outlet 17 of gas supply conduit 3.

In order to separate carbon dioxide from the air, the apparatus is filled with a potassium sulphate solution to which an extra quantity of potassium hydroxide has been added and contacts 12 and 13 are connected to the negative terminal of a voltage source and contact 10 is connected to the positive terminal of this voltage source. Through conduit 3 the air to be purified is blown into the catholyte, the electrolyte which is alkaline, i.e. which has a pH on the opposite side of a neutral pH from the acid pH of the aqueous solution of the carbon dioxide being separated.

The electrolysis must first take place for some time before in the space inside the porous container 16 the anolyte and in the space outside said container the catholyte can be formed. However, due to the excess of potassium hydroxide in the solution the carbon dioxide from the air, leaving through opening 17 of conduit 3 and rising upward through the solution, is immediately bound and converted into potassium carbonate. Opening 17 may be covered with gauze, or in the lower part of conduit 3, which reaches down into the solution, a number of small openings may be provided, so that the air rises up in the solution in the form of small bubbles. Gauze wall 22 keeps the rising air away from electrode 14. The purified air is collected in the space above the liquid level and removed through conduit 4. In order to prevent as much as possible that the removed air carries along water vapour, inlet 18 of conduit 4 may be funnel shaped, the opening of which funnel is covered with gauze against which the water vapour condenses and from there drips back into the solution.

Due to the continued electrolysis the dissociation products are not only separated from the potassium sulphate present in the solution but also from the potassium carbonate formed. As a result fresh alkaline catholyte, potassium hydroxide and water are continuously formed at cathodes 14 and 15 and at anode 11 acid anolyte is formed consisting of sulphuric acid, carbon dioxide and water.

The carbon dioxide is expelled from the solution by the sulphuric acid and collected in the space inside container 16 above the liquid level and removed through conduit 5. Through conduits 6 and 7 the gases are removed which may evolve at electrodes 14 and 15 due to the electrolysis of the solution. Electrode 11 may likewise be surrounded by a partition wall, which wall is under the liquid level provided with openings and isolates a space about the electrode from the remaining electrolysis space, which is connected to an exhaust conduit, which removes the primary or secondary gases resulting from the electrolysis.

The drawing according to FIG. 1 presents the cross-section of a rectangular vessel about which there are provided two walls 20 and 21, two electrodes 14 and 15 connected to the negative terminal of a voltage source and two gas exhaust conduits 6 and 7. However, it is sufficient to provide one cylindrical wall which is surrounded by one cylindrical electrode, the space above the liquid level at the outside of the cylindrical wall being connected to one gas exhaust conduit.

By changing the polarity of the electrodes the apparatus can be used for separating components having an alkaline reaction from gases.

FIG. 2 shows a cross-section of another embodiment of the device according to the invention which can for example be used for the separation of gases which remain in solution for a long time or are easily soluble in water.

In FIG. 2 vessel 24 is hermetically closed by cover 25 and up to liquid level 26 it is filled with an aqueous solution 27 of potassium sulphate to which for the separation of components having an acid reaction an excess of alkali has been added and for the separation of components having a alkaline reaction an excess of acid.

In the vessel there are two electrodes separated by diaphragm 28, electrode 29 being provided with a connecting contact 30, which can be connected to the one terminal of a voltage source and electrode 31 being provided with a connecting contact 32, which can be connected to the other terminal of this voltage source. To the bottom 33 of the vessel at the side of the diaphragm facing electrode 29, a conduit 34 is connected, through which liquid is removed from the container and by a pump 35 is led through a conduit 36 which ends inside the vessel into a spray 37 through which the liquid is poured out in finely distributed condition across a bed 38 of comminuted material along which the liquid drips off and returns into solution 27. The gases to be purified are supplied through conduit 39, which within the vessel ends in a perforated outlet 40 which is protected against liquid dripping from bed 38 by a drop catching device 41. The purified gases are removed through pipe 44. space 42 partitioned off by diaphragm 28 at the side of electrode 31 is connected to gas exhaust conduit 43.

For the separation of components having an acid reaction electrode 29 is connected to the negative terminal of a voltage source and electrode 31 is connected to the positive terminal of this voltage source. The alkaline catholyte formed is pumped out of the solution and poured out across bed 38 where is comes into contact with the gases to be purified. The components having an acid reaction from the gases are absorbed by the alkaline catholyte dripping along the bed and bound to a salt. The dissociation products of this salt are separated in solution 27 so that in the space at the side of diaphragm 28 facing electrode 29 fresh alkaline catholyte is formed and in the space at the side of diaphragm 28 facing electrode 31 the absorbed gas is expelled from the acid anolyte and removed through conduit 43.

For the separation of components having an alkaline reaction from gases electrode 29 is connected to the positive terminal of a voltage source and electrode 31 to the negative terminal of this voltage source in which case acid anolyte is pumped around and poured out across bed 38.

In principle the electrolyte solution is so composed that due to the electrolysis no gaseous products evolve which may be carried along by the gas to be purified.

In the embodiment according to FIG. 2 electrode 29 just as electrodes 14 and 15 in FIG. 1 may be provided in a space, which by a separating wall is isolated from the remaining electrolysis space, which separating wall is provided with openings below the liquid level. The space which thus surrounds electrode 29 can be connected to an exhaust pipe, through which the gases formed at this electrode due to the electrolysis can be removed.

A similar partition wall provided with openings below the liquid level may also be provided about electrode 31, so that the gases formed due to the electrolysis at electrode 31 can be collected in the space thus isolated, which gases can be removed through an exhaust pipe.

In the space through which the gases to be purified are led, other means apart from an aqueous solution of an electrolyte may be provided which promote an absorption.

In this space active carbon, silica gel and similar substances may for example be provided, which absorb gases and are purified by the electrolysis applied according to the invention.

The method and the device according to the invention are especially suitable for the removal of carbon dioxide from air in submarine vessels and in storing places for fruit and vegetables.

The method and the device according to the invention is furthermore suited for the purification of gases and vapours of organic compounds from acid or basic components present therein. Thus for example sulphur dioxide may be removed and recovered from crude oil cracking gases.

I claim:

1. A process for separating from a mixture of gases a gas the aqueous solution of which has a pH which is more remote from a neutral pH than the other gases in said mixture, comprising preparing an aqueous solution of a salt of a strong non-volatile alkali and a strong non-volatile acid, placing the solution in a sealed electrolysis apparatus having electrodes of opposite polarity separated by a membrane pervious only to ions, passing a current through said electrolysis apparatus, passing the mixture of gases into the electrolyte around the electrode at which the electrolyte has a pH on the opposite side of a neutral pH from the pH of the aqueous solution of the gas to be separated to cause the gas to be separated to enter into a reaction with the electrolyte within the cell, and conducting the gases evolved at the electrodes away from the electrolysis apparatus separately.

2. A process as claimed in claim 1 in which a substance taken from the group consisting of a soluble strong alkali and a soluble strong acid, said substance having a pH on the opposite side of neutral from the pH of the aqueous solution of the gas to be separated is added to the electrolyte in addition to the said salt.

3. A process as claimed in claim 1 in which the gas to be separated is one the aqueous solution of which is acid, and the acid radical of the salt is of an acid which has a pH which is more remote from a neutral pH than the acid of the aqueous solution.

4. A process as claimed in claim 1 in which the gas to be separated is one the aqueous solution of which is alkaline, and the alkaline radical of the salt is of an alkali which has a pH which is more remote from a neutral pH than the alkali of the aqueous solution.

5. A process for separating two gases, the aqueous solution of one of which has a pH on one side of a neutral pH and the aqueous solution of the other of which has a pH on the opposite side of a neutral pH, comprising preparing an aqueous solution of a salt of a strong non-volatile alkali and a strong non-volatile acid, placing the solution in a sealed electrolysis apparatus having electrodes of opposite polarity separated by a membrane pervious only to ions, passing a current through said electrolysis apparatus, passing the two gases into the electrolyte around the electrode at which the electrolyte has a pH on the opposite side of a neutral pH from the pH of the aqueous solution of the gas to be separated to cause the gas to be separated to enter into a reaction with the electrolyte within the cell, and conducting the gases evolved at the electrodes away from the electrolysis apparatus separately.

References Cited by the Examiner

UNITED STATES PATENTS

| | | | |
|---|---|---|---|
| 1,125,201 | 1/15 | Statham | 204—265 |
| 1,319,365 | 10/19 | Steinbuch et al. | 204—265 |
| 1,431,301 | 10/22 | Grunstein et al. | 204—265 |
| 2,153,569 | 4/39 | Jones et al. | 204—265 |
| 2,383,674 | 8/45 | Osborne | 204—87 |
| 2,780,593 | 2/51 | Snow et al. | 204—265 |
| 2,726,930 | 12/55 | Edwards et al. | 204—130 |
| 2,768,945 | 10/56 | Shapiro | 204—72 |
| 2,793,182 | 5/57 | Visnapu | 204—130 |
| 2,810,686 | 10/57 | Bodamer et al. | 204—130 |

FOREIGN PATENTS 443,684   5/27   Germany.

JOHN H. MACK, *Primary Examiner.*

JOSEPH REBOLD, JOHN R. SPECK, *Examiners.*